(12) United States Patent
Salzmann et al.

(10) Patent No.: US 8,807,295 B2
(45) Date of Patent: Aug. 19, 2014

(54) BRAKE CALIPER OF A DISK BRAKE

(75) Inventors: Sebastian Salzmann, Maintal (DE); Götz Mehner, Königstein (DE); Ralph Petri, Sulzbach/Ts. (DE); Christoph Kalff, Lörzweiler (DE)

(73) Assignee: Continental Teves AG & Co. oHG (DE)

( * ) Notice: Subject to any disclaimer, the term of this patent is extended or adjusted under 35 U.S.C. 154(b) by 230 days.

(21) Appl. No.: 13/379,726

(22) PCT Filed: Jun. 30, 2010

(86) PCT No.: PCT/EP2010/059280
§ 371 (c)(1),
(2), (4) Date: Mar. 16, 2012

(87) PCT Pub. No.: WO2011/000867
PCT Pub. Date: Jan. 6, 2011

(65) Prior Publication Data
US 2012/0160618 A1    Jun. 28, 2012

(30) Foreign Application Priority Data

Jun. 30, 2009  (DE) .................. 10 2009 027 363
Jul. 24, 2009  (DE) .................. 10 2009 034 503

(51) Int. Cl.
  *F16D 55/08*    (2006.01)
  *F16D 65/14*    (2006.01)
  *F16C 17/04*    (2006.01)

(52) U.S. Cl.
  USPC .......... 188/72.6; 188/72.8; 384/123; 384/305

(58) Field of Classification Search
  USPC ............. 188/72.6, 72.7, 72.8, 72.9; 384/420, 384/425, 121, 123, 305
  See application file for complete search history.

(56) References Cited

U.S. PATENT DOCUMENTS

| | | | | |
|---|---|---|---|---|
| 3,873,168 A | * | 3/1975 | Viola et al. ................. | 384/298 |
| 8,900,277 | | 10/1991 | Meyer | |
| 5,565,514 A | | 10/1996 | Carlberg | |
| 5,821,204 A | * | 10/1998 | Kato et al. ................. | 508/106 |
| 6,957,917 B2 | * | 10/2005 | Mahieux et al. ............ | 384/121 |

(Continued)

FOREIGN PATENT DOCUMENTS

| | | |
|---|---|---|
| DE | 251984 | 1/1967 |
| DE | 8900277 | 6/1990 |

(Continued)

OTHER PUBLICATIONS

German Application Serial No. 102009034503.5, German Search Report mailed Jun. 9, 2010, 8 pgs.

(Continued)

*Primary Examiner* — Thomas J Williams
(74) *Attorney, Agent, or Firm* — RatnerPrestia

(57) ABSTRACT

A brake caliper of a disk brake, includes a housing having a bore hole, in which an axially displaceable piston is arranged, and a shaft for actuation, which is supported so that it is rotatable and axially displaceable in the housing, and an adjusting device having a spindle to compensate for brake lining wear, an axial bearing being provided between the spindle and the shaft. For an improved wear resistance, it is proposed according to the invention that the axial bearing be integrally formed from a homogeneous material matrix.

15 Claims, 3 Drawing Sheets

(56) References Cited

U.S. PATENT DOCUMENTS

| | | |
|---|---|---|
| 6,976,788 B2 * | 12/2005 | Honda et al. .................. 384/305 |
| 2002/0041123 A1 | 4/2002 | Runkel |
| 2002/0079172 A1 | 6/2002 | Shaw |
| 2008/0135354 A1 | 6/2008 | Petri |
| 2008/0283345 A1 | 11/2008 | Balz |

FOREIGN PATENT DOCUMENTS

| | | |
|---|---|---|
| DE | 19858651 | 8/2000 |
| DE | 102005008424 A1 | 6/2006 |
| DE | 102005056166 A1 | 6/2006 |
| DE | 102005054113 A1 | 5/2007 |
| DE | 102006037660 A1 | 7/2007 |
| EP | 0436906 A1 | 7/1991 |
| EP | 1387097 A1 | 2/2004 |
| GB | 1077142 | 7/1967 |

OTHER PUBLICATIONS

International Application Serial No. PCT/EP/2010/059280, International Search Report and Written Opinion mailed Oct. 6, 2010, 14 pgs.

* cited by examiner

BRAKE CALIPER OF A DISK BRAKE

CROSS REFERENCE TO RELATED APPLICATIONS

This application is the U.S. National Phase Application of the PCT International Application No. PCT/EP2010/059280, filed Jun. 30, 2010, which claims priority to German Patent Application No. 10 2009 027 363.8, filed Jun. 30, 2009, and German Patent Application No. 10 2009 034 503.5, filed Jul. 24, 2009, the contents of such applications being incorporated by reference.

FIELD OF THE INVENTION

The invention relates to a brake caliper of a disk brake having an axial bearing, comprising a housing having a bore hole, in which an axially displaceable piston is arranged, and a shaft for actuation, which is supported so that it is rotatable and axially displaceable and with one shaft end passes through a housing aperture, and two contra-rotating ramp elements, of which one ramp element is rotationally fixed to the housing and one ramp element is rotationally fixed to the shaft, and an adjusting device having a spindle, the adjusting device lying between the shaft and the piston, and an axial bearing acting between the spindle and the shaft.

BACKGROUND OF THE INVENTION

EP 0 436 906 B1, which is incorporated by reference, discloses a combined brake caliper of generic type for a motor vehicle disk brake having an axial bearing. The brake caliper comprises a housing having a bore hole, in which a brake actuating piston is displaceably arranged. For parking brake operations, a shaft is rotatably supported in the brake housing, the shaft passing through the brake housing and being connected to one ramp element of a ramp arrangement. A second associated ramp element is arranged, fixed to the housing. Owing to a wedge mechanism-like action between the shaft and the ramp arrangement, the shaft under a rotational actuating movement also experiences an axial displacement. The shaft transmits this axial displacement to a spindle of an adjusting device, an axial bearing being provided between the shaft and the spindle. The axial displacement is transmitted to the piston via the adjusting device. Here a casing of the adjusting device is rotationally fixed to the ramp arrangement integral with the housing.

In order to relieve the components of the torsional safeguard, it is proposed to produce the axial bearing from sheet steel, which is provided with a low-friction coating of polytetrafluoroethylene, in which a lead-copper mixture is embedded.

It has emerged that, under particularly intensive stresses and/or over a long operating time, steel sheets coated in this way may suffer from the drawback that the coating peels off. This peeling occurs particularly when some, perhaps slight, skewing prevails between the friction pairing involved. Then an excessive surface pressure due to localized over-stressing of the coating causes it to peel off in the area of a boundary surface between the base material and the coating material of the axial bearing. As a result the friction-reducing characteristics of the axial bearing are lost, and there is the risk that peeled coating parts or particles might get into the brake fluid and contaminate the latter. It should be noted that axial alignment errors or skewing cannot be entirely excluded in the brake calipers of generic type, for which reason a convexly curved axial bearing is particularly recommended in EP 436 906 B1, in order to avoid these problems.

SUMMARY OF THE INVENTION

An aspect of the present invention aims to provide an improved brake caliper of generic type having, in particular, improved wear properties for low manufacturing costs.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
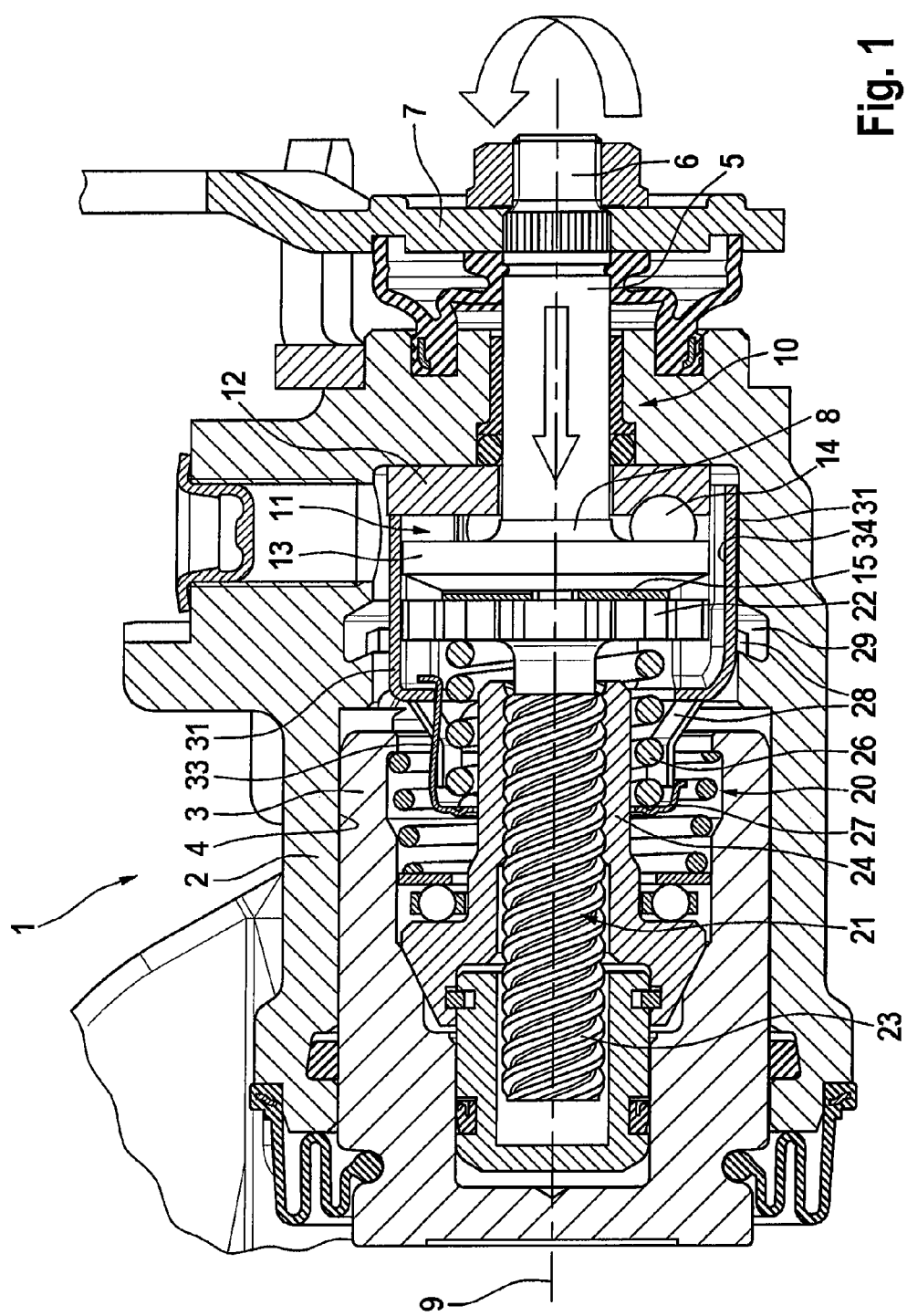
FIG. 1 shows an enlarged sectional view of a brake caliper with adjusting and actuating device according to a first embodiment.

Among other things a brake caliper 1 of a motor vehicle disk brake comprises a housing 2, a piston 3, which for brake actuation is displaceably arranged in a bore hole 4. Here the piston 3, in service braking, is displaced by means of hydraulic pressurization. For translation to a parking brake operation, a shaft 5 is provided, by means of which the piston 3 can be displaced inside the bore hole 4 along a longitudinal axis 9 by way of an actuating device 10. The shaft 5, with one shaft end 6, to which an actuating lever 7 is attached, passes through an aperture of the housing 2. The actuating device 10 acts on the piston 3 through the interposition of an adjusting device 20 of variable length.

The actuating device 10 comprises a ramp arrangement 11, which comprises a ramp element 12 integral with the housing and a ramp element 13, rotatable in relation to the former. Here the ramp element 13 is integrally formed on a disk-shaped end portion 8 of the shaft 5. Multiple rolling elements 14 are arranged between the ramp elements 12, 13, so that as the ramp elements 12, 13 rotate in opposite directions the ramp arrangement 10 produces an axial displacement of the shaft 5—symbolized by an arrow—along the longitudinal axis 9 in the actuating direction.

Situated between the end portion 8 of the shaft 5 and the piston 3 is an adjusting device 20 of variable length, which transmits the stroke of the ramp arrangement 11 to the piston 3 and furthermore compensates for the wear of the brake linings (not shown) and the associated brake disk (not shown). Among other things, this adjusting device 20 comprises a spindle 21 having an end portion 22 and a nut 24, which is screwed on to the shank 23 of the spindle 21 and bears on the piston 3. An axial bearing 15 of disk-shaped slide bearing design is provided between the end face of the spindle 21 and the end portion 8.

A spring 26, by way of a spring cup 27, preloads the spindle 21 towards the axial bearing 15. The spring cup 27 is axially and radially braced, by means of protruding clips 28, in recesses 29 in the bore hole 4.

Multiple, regular teeth of the toothing system 30 are attached to the circumference of an end portion 22 of the spindle 21, so that the end portion 22 presents a virtually star-shaped cross section. In order to secure the spindle 21 against torsion, a casing 31 integral with the housing encloses the end portion 22. Since the casing 31, at least in part, has a virtually star-shaped internal profile 34 corresponding to the end portion 22, it engages in the toothing system 30 and together with the end portion 22 forms a positively interlocking connection in a tangential direction. The spindle 21 is thereby displaceable in the actuating direction but at the same time seated, torsionally secured, inside the casing 31 and hence also in the brake caliper 1.

Figure 2:
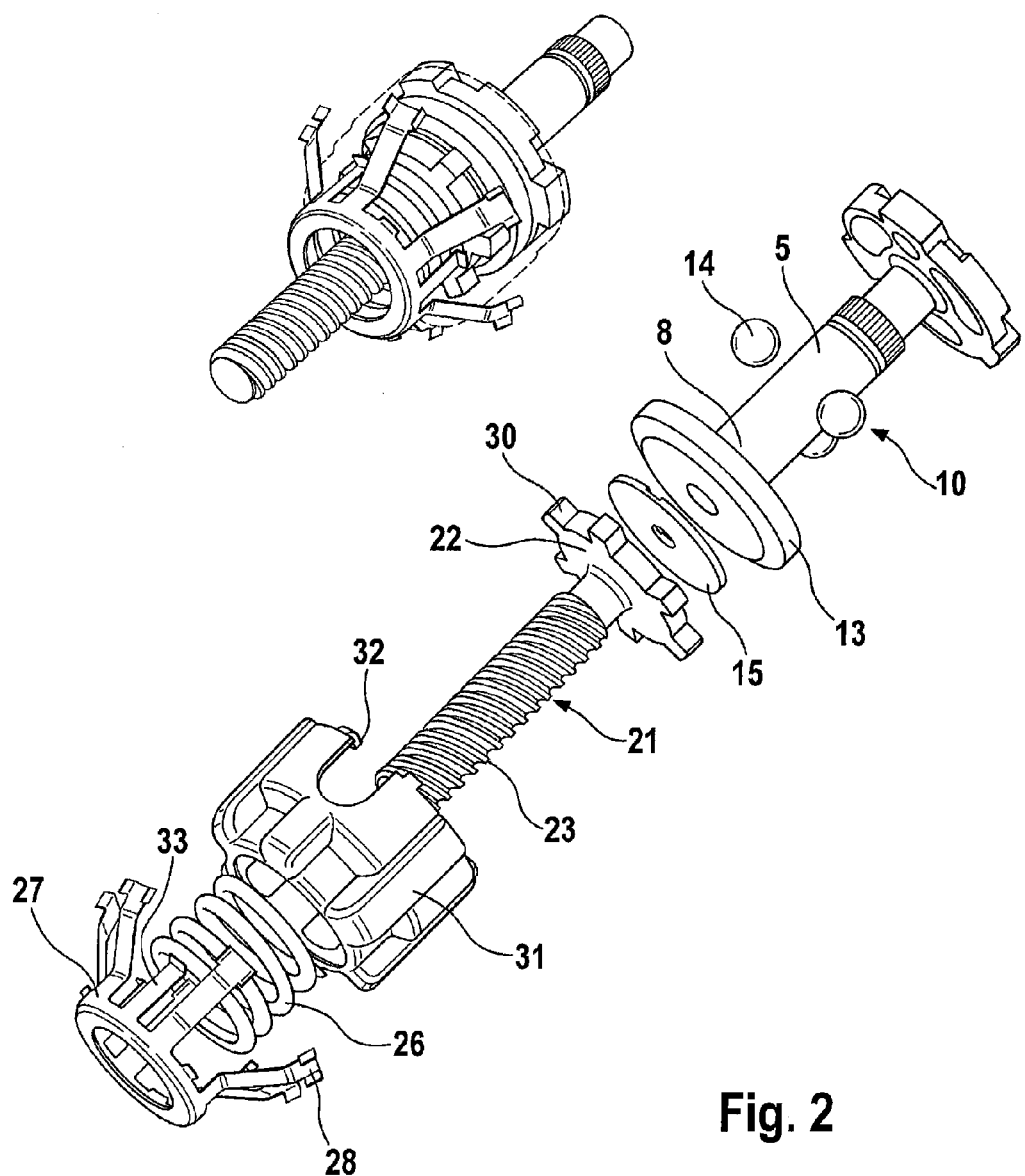
FIG. 2 shows an exploded scale drawing of the embodiment with axial bearing disk, and FIGS. 3a, b, c show enlarged views of the axial bearing disk.
Figure 3:
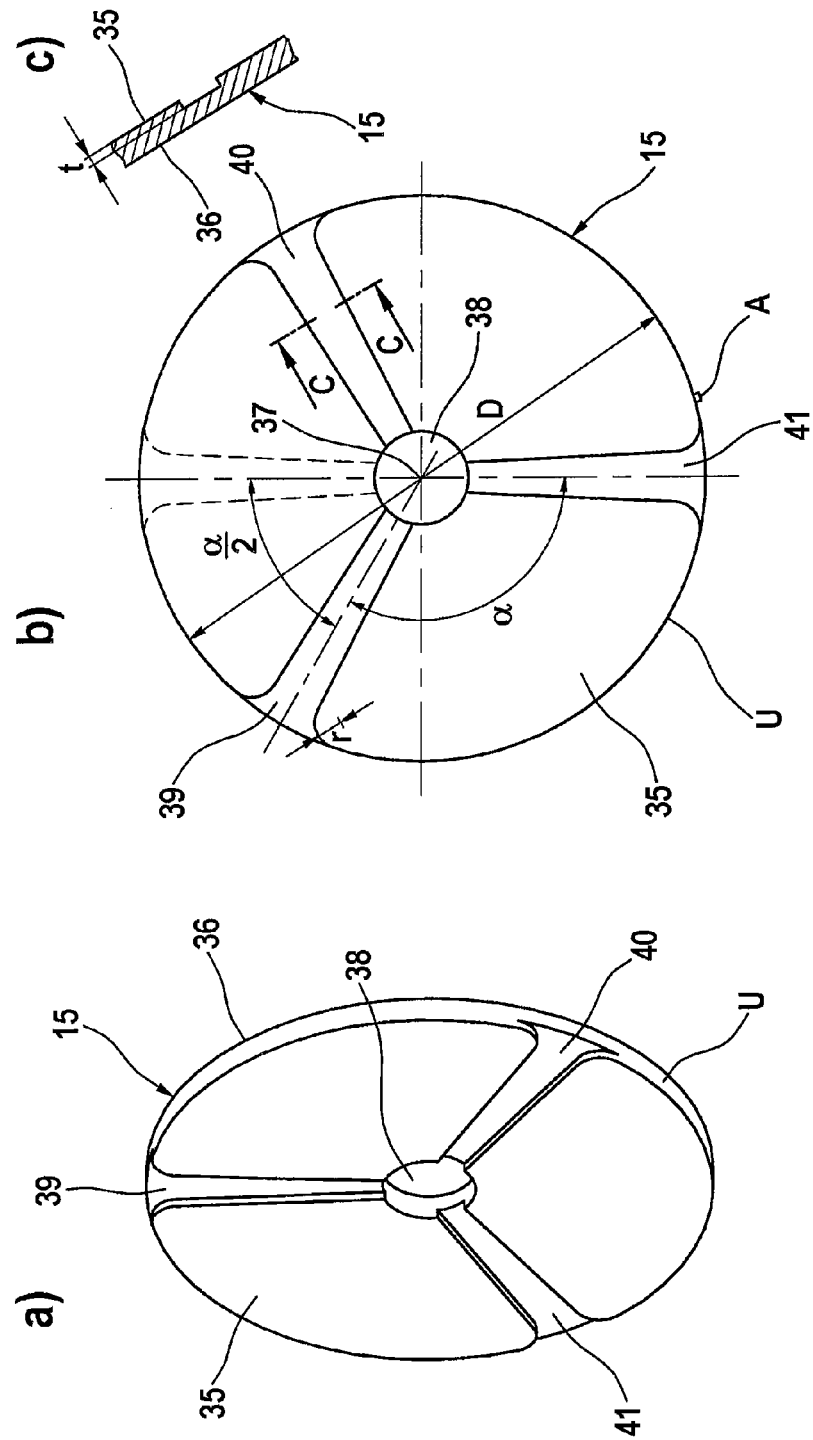

In order to form an easily handled assembly unit, according to aspects of the invention the main components of the mechanical actuating device 10 and the adjusting device 20 are joined together to form one unit, which is illustrated in particular in FIG. 2. Here a fixing between the spring cup 27 and the ramp element 12 affords a pre-assembled union of the casing 31. The pre-assembled unit furthermore comprises the ramp arrangement 11, the shaft 5, the axial bearing 15, the spindle 21, the spring 26 and the casing 31 together with the spring cup 27.

To assemble the casing 31, the ramp arrangement 11, the axial bearing 15 and the spindle 21 are first inserted into the casing 31, which by bent clips 32 is then locked to the rotationally fixed ramp element 12, thus captively holding the individual components together in the contour of the casing 31. The spring cup 27 together with the internal spring 26 on protruding clips 33 can then be latched to the casing 31. The resulting pre-assembled assembly unit can be handled separately and after introducing it into the bore hole 4 snaps by way of further protruding clips 28 of the spring cup 27 into recesses 29 in the brake caliper 1.

The parking brake function occurs as follows. On actuation of the parking brake, the shaft 5 and the end portion 8 are turned and the ramp arrangement 11 rotated by the actuating lever 7. As a result the two ramp elements 12 and 13 produce an axial displacement of the shaft 5 and the end portion 8. This axial displacement is transmitted by the axial bearing 15 to the end portion 22 and to the spindle 21. Since the spindle 21 is guided, rotationally fixed in the casing 31, by the toothing system 30 of the end portion 22, the spindle 21 only performs an axial displacement without rotation. The piston 3 is moved axially by way of the nut 24 screwed onto the shank 23 and actuates the brake linings (not shown) in the direction of the brake disk (not shown).

The main features of the axial bearing 15 according to aspects of the invention will be examined below. According to this the axial bearing 15 is integrally formed from a homogeneous material matrix. To put it another way, the axial bearing 15 comprises a material component, this material component being an extremely homogeneous mixture of several constituents having different fractions, so that as a result there is no division into a base or substrate material (carrier) and a coating material (coating). The use of such a virtually homogeneous material matrix creates a uniform, integral body, which throughout has the same friction characteristics over the entire component life, even if wear occurs to a certain extent. There is therefore no risk of the friction properties varying due to ageing, and of separate detachment of the coating or coating particles. This construction affords a particular advantage in that the separate manufacture of a substrate for the axial bearing 15, and its preparation for a coating, and also the coating process as such, can be dispensed with, so that an especially cost-effective manufacturing process is possible. Manufacturing can be undertaken by molding, for example, such as in particular by thermal injection molding of a polymer material in the interests of a cost-effective polymer composite component, a mold parting parallel to the end faces 35, 36 of the axial bearing 15 being particularly advantageous. Done in accordance with the invention, delamination, that is to say layer peeling, does not occur.

In the preferred embodiment the axial bearing 15 is formed from a non-metallic polymer material, which forms the material matrix. Slide bearing heavyweight metals, such as copper, tin and lead compounds are thereby largely obsolete. There is the further advantage accruing that no anticorrosion measures are necessary in the area of the axial bearing 15. A stainless carrier element (disk) is not required, since the fundamentally hygroscopic brake fluid causes no corrosive attack of any kind to the entirely non-metallic material of the axial bearing 15.

For reinforcing the material matrix, the latter may, at least in parts, comprise reinforcing inlays, such as, in particular, a fiber reinforcement, it being possible in principle for multiple statistically, that is to say theoretically non-directional synthetic fibers (filament, yarn or twisted yarn), in particular portions of carbon, glass or aramid fibers, to be embedded virtually homogenously in the composite matrix. Alternating fractions or mixtures of the aforementioned fiber portions and constituents are also feasible. In principle it is feasible, either as an alternative or in addition, for the fiber reinforcement to take the form of a woven fabric. This gives the axial bearing 15 its internal cohesion, as well as ultimate strength and resistance to misalignment and skewed wearing, and increased high-temperature strength. The use of carbon fibers is particularly advantageous, because the atomic lattice structure affords particularly favorable tribological characteristics of the friction pairing involved—generally stainless steel alloy material.

The fibers are at least in the main completely embedded inside the polymer material, which occurs as a viscous dough-like resin, at least during the molding thereof. Here the material is more preferably a thermoplastic, tough polymer material (plastic), such as, in particular, one of the group of polyether ketones (abbreviation PEK), in particular polyether ether ketone (abbreviation PEEK; PEEEK, PEEKEK), because these materials have a high glass transition temperature and fluxing temperature and thereby especially favorable high-temperature strength characteristics.

Each axial bearing 15 is in principle designed as a flat, plane circular disk of diameter D, the disks having end faces 35, 36 facing the friction pairings and a through-bore hole 38 being provided at a center 37 of the circular disk.

At least one of the end faces 35, 36 and preferably both end faces 35, 36 of the axial bearing 15 have multiple grooves 39, 40, 41 of uniform design radiating radially outwards from the center 37 and regularly distributed at the same angle α. In the case of a bilateral arrangement the grooves 39, 40, 41 of the end face 35 are offset at an angle of preferably α/2 in relation to the grooves of the end face 36, in order that no notch effect occurs. In the embodiment three grooves 39, 40, 41 are provided. The grooves 39, 40, 41 have a (channel) cross section widening radially outwards. Here the cross section of the grooves 39, 40, 41 is largely of rectangular shape. The grooves 39, 40, 41 are of substantially constant depth t. In plan view each groove 39, 40, 41 is of trapezoidal design. Radially outwards the grooves 39, 40, 41 merge, radiused with a radius r, that is to say gradually, into the circumference U of the axial bearing. A residue of a sprue A may indicate manufacture by injection molding. Residues of an annularly circumferential mold parting burr at the circumference U on the axial bearing may also remain, and are likewise indicative of manufacture by injection molding.

LIST OF REFERENCE NUMERALS 1 brake caliper
2 housing 3 piston
4 bore hole
5 shaft
6 shaft end
7 actuating lever
8 end portion
9 longitudinal axis
10 actuating device
11 ramp arrangement
12 ramp element
13 ramp element
14 rolling element
15 axial bearing
20 adjusting device
21 spindle
22 end portion
23 shank
24 nut
26 spring
27 spring cup
28 clip
29 recess
30 toothing system
31 casing
32 clip
33 clip
34 internal profile
35 end face
36 end face
37 center
38 through-bore hole
39 groove
40 groove
41 groove
α angle
t depth
r radius
U circumference
A sprue
D diameter

The invention claimed is:

1. A brake caliper of a disk brake, comprising
 a housing having a bore hole, in which an axially displaceable piston is arranged, and
 a shaft for actuation, which is supported so that it is rotatable and axially displaceable in the housing, and with one shaft end passes through a housing aperture, comprising two contra-rotating ramp elements for converting a rotational movement of the shaft into an axial displacement of the piston, one ramp element being rotationally fixed to the housing and one ramp element being rotationally fixed to the shaft, and
 an adjusting device having a spindle, an axial bearing being provided between the spindle and the shaft, wherein the axial bearing is integrally formed from a homogeneous material matrix
 wherein at least one end face of the axial bearing comprises multiple grooves radiating radially outwards from a center; and
 wherein the grooves have a cross section widening radially outwards.

2. The brake caliper as claimed in claim 1, wherein the axial bearing is formed from non-metallic material.

3. The brake caliper as claimed in claim 1, wherein the material matrix, at least in part, comprises a fiber reinforcement.

4. The brake caliper as claimed in claim 3, wherein as a constituent the fiber reinforcement comprises one or more statistically non-directional embedded synthetic fibers in the form of a filament, yarn or twisted yarn, in the form of artificial fiber portions or an artificial fiber woven fabric, or a combination of one or more of these constituents.

5. The brake caliper as claimed in claim 3, wherein the fiber reinforcement comprises at least one carbon fiber fraction.

6. The brake caliper as claimed in claim 3, wherein the fiber reinforcement comprises at least one glass fiber fraction.

7. The brake caliper as claimed in claim 1, wherein the material matrix comprises at least one plastic material fraction.

8. The brake caliper as claimed in claim 7, wherein the plastic material comprises a polymer material, in particular.

9. The brake caliper as claimed in claim 8, wherein the polymer material is a thermoplastic polymer material.

10. The brake caliper as claimed in claim 8, wherein the polymer material belongs to the polyether ketone (PEK) group.

11. The brake caliper as claimed in claim 1, wherein in plan view the grooves are of trapezoidal shape.

12. The brake caliper as claimed in claim 1, wherein a cross section of the grooves is largely of rectangular shape.

13. The brake caliper as claimed in claim 1, wherein the grooves are of a constant depth (t).

14. The brake caliper as claimed in claim 1, wherein the grooves open radially outwards, radiused with a radius (r), into a circumference (U) of the axial bearing.

15. A brake caliper of a disk brake, comprising
 a housing having a bore hole, in which an axially displaceable piston is arranged, and
 a shaft for actuation, which is supported so that it is rotatable and axially displaceable in the housing, and with one shaft end passes through a housing aperture, comprising two contra-rotating ramp elements for converting a rotational movement of the shaft into an axial displacement of the piston, one ramp element being rotationally fixed to the housing and one ramp element being rotationally fixed to the shaft, and
 an adjusting device having a spindle, an axial bearing being provided between the spindle and the shaft, wherein the axial bearing is integrally formed from a homogeneous material matrix;
 wherein at least one end face of the axial bearing comprises multiple grooves radiating radially outwards from a center;
 wherein at least one end face of the axial bearing comprises multiple grooves radiating radially outwards from a center; and
 wherein the grooves are arranged on each of the end faces of the axial bearing.

* * * * *